LOGIC CIRCUIT

Filed June 2, 1966

INVENTOR.
WILLIAM HENN
BY Samuel Cohen
ATTORNEY 3,457,434
Patented July 22, 1969

3,457,434

LOGIC CIRCUIT

William Henn, Lexington, Mass., assignor to Radio Corporation of America, a corporation of Delaware Filed June 2, 1966, Ser. No. 554,891
Int. Cl. H03k *19/22*
U.S. Cl. 307—203 6 Claims

ABSTRACT OF THE DISCLOSURE

A circuit for accepting the first occurring of a train of pulses and rejecting the remaining pulses. The circuit includes two flip-flops, each comprising two logic gates such as NOR gates, and a direct connection from an output terminal of each flip-flop to an input terminal of the other flip-flop. The input pulses are applied to an input terminal of one of the flip-flops.

In an asynchronous data processing machine, when the control unit generates a command indicative of an operation to be performed, this command may be conditional upon the status of a related vent such as the completion of an operation called for by a previous command. As one example, the machine adder should not, in response to an add command, attempt to add a number stored in the machine memory to the sum of two other numbers if any one or more of these numbers is not yet available when the add command arrives.

The circuit of the present invention is a decision making circuit for problems of the sort mentioned above. When an operating unit in the processor is free to follow a command, the circuit of the invention is placed in an "accept" condition. In this condition, it accepts the first occurring of successive pulses which may be indicative of successive machine commands. This accepted pulse automatically causes the circuit to assume a "reject" condition. In the latter condition, the circuit rejects the pulses subsequent to the first pulse. The circuit may be returned to its accept condition upon the completion of certain external events, by applying a "clear" pulse thereto.

The circuit of the invention includes four logic gates. A first pair of said gates produce complementary outputs. The third such gate receives one such output and in response thereto applies a priming signal to the last gate. The input pulses are applied to the last gate and the first occuring one of these pulses enables the last gate. In response to this pulse, the last gate produces an output and feeds this output back to the first pair of gates and to the third gate. This output changes the state of the first pair of gates and they thereupon produce outputs which are complementary to the original outputs.

Upon the termination of the first input pulse, the signal fed back by the last gate to the third gate causes the third gate to disable the last gate and the latter remains in this disabled condition until the circuit is cleared. The circuit may be cleared by applying a control signal to the first pair of gates for returning said gates to their original state.

The invention is discussed in greater detail below and is shown in the following drawings of which:

Figure 1:
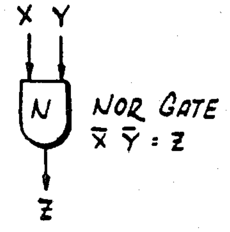
FIGURE 1 is a block circuit diagram of a NOR gate.

FIGURE 1 is self-explanatory. The Boolean equation given describes the operation of the NOR gate. The truth table for the gate is:

| X | Y | Z |
|---|---|---|
| 0 | 0 | 1 |
| 0 | 1 | 0 |
| 1 | 0 | 0 |
| 1 | 1 | 0 |

While purely arbitrary, for purposes of the present discussion, a relatively low level signal is assumed to represent the binary digit (bit) 1 and a relatively high level signal the binary digit 0. To simplify the explanation which follows, rather than speaking of a signal which represents the bit 1 or 0, the inputs and outputs of the gates are referred to as 1's or 0's, as the case may be.

Figure 2:
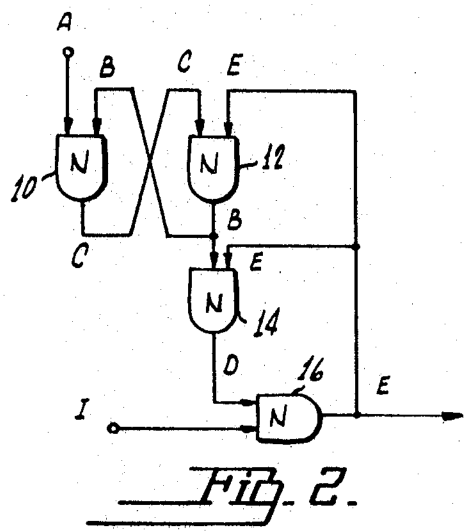
FIGURE 2 is a block circuit diagram of the logic circuit of the invention.

The circuit of the invention is shown in FIGURE 2. The circuit includes four NOR gates 10, 12, 14 and 16. The first pair of NOR gates 10 and 12 are cross-connected and operate as a flip-flop. The B output of the flip-flop serves as one input to NOR gate 14. NOR gate 16 receives the D output of NOR gate 14 and the input pulse train represented by the letter I. The output E of NOR gate 16 is applied back as one input to NOR gates 12 and 14. The A input to NOR gate 10 is for the purpose of clearing the circuit of FIGURE 2, as is discussed in more detail later.

Figure 3:
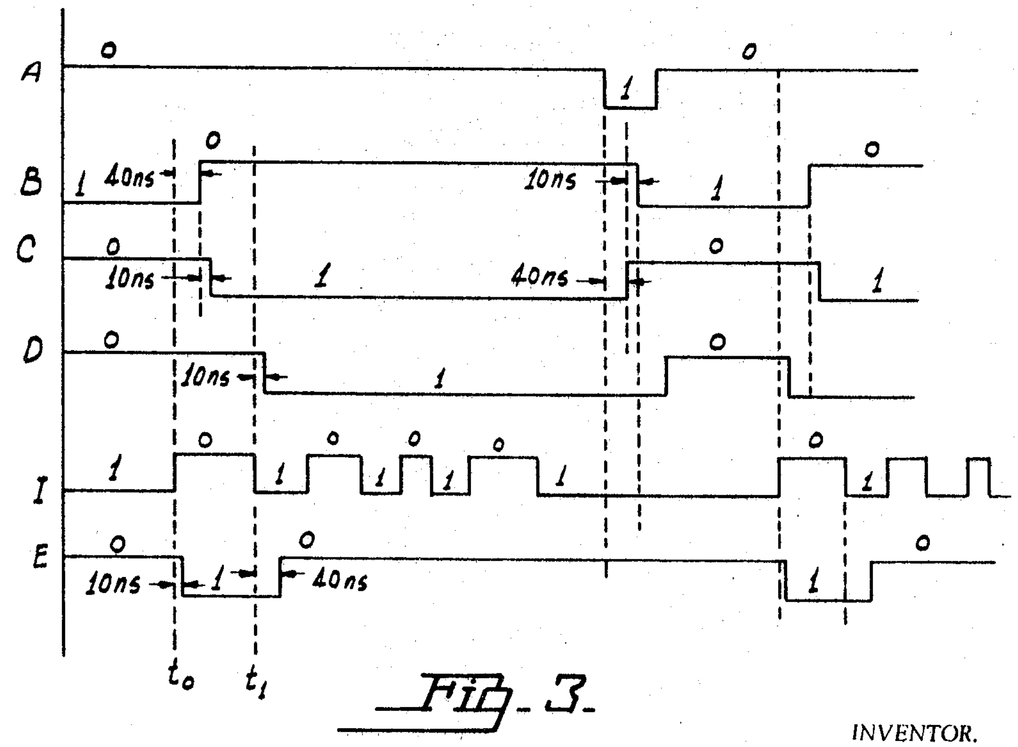
FIGURE 3 is a drawing of waveforms present in the circuit of FIGURE 2 during the operation of the circuit.

When the circuit of FIGURE 2 is in an "accept" condition, that is, in condition to receive the first pulse of an incoming pulse train, B=1, C=0, A=0 and D=0, all as indicated in FIGURE 3. Prior to the occurrence of the first pulse, I=1 so that NOR gate 16 is disabled. The output of this gate, therefore, is E=0.

At time $t_0$, I changes to 0. This corresponds to the leading edge of the first pulse. As both inputs to NOR gate 16 are 0, E changes to 1. In the particular gates employed in one specific design, the delay inherent in a gate such as 16, between the time it is enabled and the time it produces a 1 output, is 10 nanoseconds, as indicated at waveform E in FIGURE 3.

When E changes to 1, NOR gate 12 becomes disabled and B changes to 0. In the particular gates employed in a specific design, the delay inherent in a gate such as 12, between the time the gate is disabled and the time its output changes to 0, is 40 nanoseconds, as indicated at B in FIGURE 3. As A and B ar both 0, gate 10 becomes enabled and its output C changes to 1. The change of C from 0 to 1 occurs 10 nanoseconds after B changes to 0.

At time $t_1$, corresponding to the lagging edge of the first pulse, I changes from 0 back to 1. This disables NOR gate 16 and I changes to 0. Forty nanoseconds later, the output of disabled NOR gate 16 changes to E=0. When E changes to 0, NOR gate 14 becomes enabled and D changes to 1. This is a stable condition and any further changes in I have no effect on the circuit operation since D maintains gate 16 disabled. All of this is shown in FIGURE 3.

The circuit of FIGURE 2 may be cleared, that is, it may be returned to its "accept" condition by applying a pulse A=1 to the circuit as shown in FIGURE 3. This pulse disables NOR gate 10 changing C to 0 and B to 1. The circuit is now in its original condition and will accept the first pulse I=0 of the incoming pulse train.

Some important features of the present invention are that it is simple (it employs a relatively small number of gates and a relatively small number of interconnections) and it is accordingly relatively inexpensive.

What is claimed is:

1. A logic circuit comprising:

four two-input logic gates, the first and second gates interconnected from the output terminal of each gate to one input terminal of the other gate to produce complementary outputs, the third such gate directly receiving at one input terminal thereof, one such output in a sense to disable said third gate and said third gate, in its disabled condition, applying a priming signal to one input terminal of said last gate;

means coupled to the second input terminal to the last gate for applying input pulses thereto;

a feedback circuit comprising a direct connection from the output terminal of the last gate to the second input terminal of said second gate for applying a signal to said second gate, when said fourth gate is enabled, for changing the state of said pair of gates and thereby changing the sense of the signal applied by said one of said first and second gates to said third gate to prime third gate; and a feedback circuit comprising a direct connection from the output terminal of the last gate to the second input terminal to the third gate for applying a signal to the third gate in a sense to enable the third gate when said last gate is disabled.

2. A logic circuit as set forth in claim 1, wherein said gates are NOR gates.

3. A logic circuit as set forth in claim 1, further including means coupled to the second input terminal of said first gate for applying a clear signal thereto.

4. A logic circuit comprising four two-input NOR gates, the first gate connected at its output terminal to one input terminal to the second gate directly, the second gate connected at its output terminal to one input terminal to the first gate and to one input terminal to the third gate, the third gate connected at its output terminal to one input terminal to the fourth gate, the fourth gate directly connected at its output terminal to the second input terminal of the third gate and the second input terminal of the second gate, the second input terminal of the first gate being adapted to receive a clear signal, and the second input terminal of the fourth gate being adapted to receive pulses.

5. In combination:

two flip-flops, each having a set (S) and a reset (R) input terminal and a 1 and a 0 output terminal, and the operation of each flip-flop being defined in the following truth table,

| | | | | |
|---|---|---|---|---|
| S | 0 | 0 | 1 | 1 |
| R | 0 | 1 | 0 | 1 |
| 1 | N.C. | 0 | 1 | 0 |
| 0 | N.C. | 1 | 0 | 0 |

where N.C. means no change in state and the 0's and 1's within the table refer to signals which represent the binary quantities 0 and 1, respectively;

a direct connection from the 1 output terminal of the first flip-flop to the set input terminal of the second flip-flop; and a direct connection from the 1 output terminal of the second flip-flop to the reset input terminal of the first flip-flop.

6. The combination set forth in claim 5, further including means connected to the set terminal of the first flip-flop for applying a set signal thereto, and means coupled to the reset terminal of the second flip-flop for applying a signal to the reset terminal of the second flip-flop which may vary in value between levels representing 1 and 0.

References Cited

UNITED STATES PATENTS 3,078,417 2/1963 Nick ---------------- 307—223

3,395,352 7/1968 McCammon --------- 328—46

ARTHUR GAUSS, Primary Examiner

B. P. DAVIS, Assistant Examiner

U.S. Cl. X.R.

307—215, 247; 328—196